United States Patent
Bringer et al.

(10) Patent No.: US 10,938,556 B2
(45) Date of Patent: Mar. 2, 2021

(54) METHOD OF SHARING A KEY SERVING TO DERIVE SESSION KEYS FOR ENCRYPTING AND AUTHENTICATING COMMUNICATIONS BETWEEN AN OBJECT AND A SERVER

(71) Applicant: IDEMIA IDENTITY & SECURITY FRANCE, Courbevoie (FR)

(72) Inventors: Julien Bringer, Courbevoie (FR); Vincent Bouatou, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 123 days.

(21) Appl. No.: 16/205,812

(22) Filed: Nov. 30, 2018

(65) Prior Publication Data

US 2019/0173669 A1    Jun. 6, 2019

(30) Foreign Application Priority Data

Dec. 1, 2017   (FR) ...................................... 1761505

(51) Int. Cl.
*H04L 29/06*     (2006.01)
*H04L 9/08*      (2006.01)
*H04L 9/32*      (2006.01)

(52) U.S. Cl.
CPC ............ *H04L 9/085* (2013.01); *H04L 9/0819* (2013.01); *H04L 9/0866* (2013.01); *H04L 9/3242* (2013.01); *H04L 63/061* (2013.01); *H04L 2463/061* (2013.01)

(58) Field of Classification Search
None
See application file for complete search history.

(56) References Cited

U.S. PATENT DOCUMENTS

| | | | |
|---|---|---|---|
| 9,258,117 B1 * | 2/2016 | Roth ....................... | H04L 9/321 |
| 10,172,000 B2 * | 1/2019 | Link, II ................... | H04W 4/70 |
| 2003/0039362 A1 * | 2/2003 | Califano ................ | H04L 9/32 380/283 |

(Continued)

OTHER PUBLICATIONS

Preliminary Research Report and Written Opinion received for French Application No. 1761505, dated Sep. 7, 2018, 8 pages (1 page of French Translation Cover Sheet and 7 pages of original document).

(Continued)

*Primary Examiner* — Malcolm Cribbs
(74) *Attorney, Agent, or Firm* — Womble Bond Dickinson (US) LLP

(57) ABSTRACT

A method of sharing of a reference key (AppKey) between a connected object and at least one server. The method includes the object applying a function (f) to at least one datum (DevEUI, AppEUI, DevNonce) and to a key (KSE) specific to a secure element of the object to generate the reference key, transmitting to the server a join request of the object to a network of connected objects, which include the datum, and the key (KSE) of the secure element not being transmitted to the server. The method further includes obtaining, by the server, of the key (KSE) of the secure element on the basis of the request, the server applying the function (f) to the datum and to the key (KSE) obtained by the server, so as to obtain the reference key.

12 Claims, 3 Drawing Sheets

(56) References Cited

U.S. PATENT DOCUMENTS

| | | | |
|---|---|---|---|
| 2005/0074122 A1* | 4/2005 | Fascenda | H04L 9/3234 |
| | | | 380/258 |
| 2006/0167920 A1* | 7/2006 | Hankinson | G06F 16/284 |
| 2007/0160213 A1* | 7/2007 | Un | H04L 49/90 |
| | | | 380/270 |
| 2009/0150672 A1* | 6/2009 | Kwon | H04L 9/321 |
| | | | 713/169 |
| 2009/0274302 A1* | 11/2009 | Wu | H04W 12/06 |
| | | | 380/272 |
| 2011/0153644 A1* | 6/2011 | Kosuru | G06F 21/6218 |
| | | | 707/769 |
| 2015/0143125 A1* | 5/2015 | Nix | G06F 21/35 |
| | | | 713/171 |
| 2016/0210470 A1* | 7/2016 | Rozenberg | G06F 16/22 |
| 2017/0093565 A1* | 3/2017 | Yang | H04W 12/04033 |
| 2017/0359717 A1* | 12/2017 | Adler | H04W 12/04071 |

OTHER PUBLICATIONS

Naoui et al., "Trusted Third Party Based Key Management for Enhancing LoRaWAN Security", 2017 IEEE/ACS 14th International Conference on Computer Systems and Applications (AICCSA), 2017, pp. 1306-1313.

Kim et al., "A Dual Key-Based Activation Scheme for Secure LoRaWAN", Wireless Communications and Mobile Computing, vol. 2017, Article ID 6590713, Apr. 28, 2017, 12 pages.

Aras et al., "Exploring the Security Vulnerabilities of LoRa", 2017 3rd IEEE International Conference on Cybernetics (CYBCONF), 2017, 6 pages.

* cited by examiner

METHOD OF SHARING A KEY SERVING TO DERIVE SESSION KEYS FOR ENCRYPTING AND AUTHENTICATING COMMUNICATIONS BETWEEN AN OBJECT AND A SERVER

FIELD OF THE INVENTION

The present invention relates to the field of objects connected to a network, such as Internet ("Internet of Things").

The invention relates quite particularly to a method of sharing of a key serving to derive session keys for encrypting and authenticating communications between an object and a server.

The invention applies advantageously to networks of connected objects in accordance with the specification LoRaWAN®.

PRIOR ART

The specification LoRaWAN defines a communications protocol for a network of connected objects. In such a network, an object (sometimes called terminal or "end-device") is led to communicate with a server forming part of such a network.

The specification LoRaWAN version 1 proposes using two session keys NwkSKey, AppSKey for encrypting and authenticating communications between the object and the server.

Also, the session keys NwkSKey, AppSKey must be derived from an application key AppKey, when this object sends to the server a join request to a network of connected objects. Each object has its own application key AppKey. This application key AppKey is provided by an application provider.

A major restriction is that the application key AppKey must be a secret shared between the object and the server.

For this restriction to be respected, the specification LoRaWAN proposes preloading a value of application key AppKey in a memory of the object, during a configuration step of the object conducted prior to its being commissioned. Such a preloading step is for example conducted in the document by Jaehyu Kim et al: "a dual key-based activation scheme for secure LoRaWAN".

Such preloading is restrictive, however. In fact, it is not necessarily known, at the time when this configuration step is conducted, with which server the object will be led to communicate once it is commissioned.

SUMMARY OF THE INVENTION

An aim of the invention is sharing a key between a connected object and a server of a network of connected objects in a first manner less restrictive while being secure.

According to an aspect of the invention, a method of sharing of a reference key between an object to be connected to a network of connected objects and at least one server is proposed, the method comprising the steps of:
application, by the object, of a first predetermined function to at least one first datum and to a key specific to a secure element of the object, so as to generate the reference key,
transmission to the server of a join request of the object to a network of connected objects, the join request comprising the first datum, the key specific to the secure element however not being transmitted by the object to the server,
obtaining, by the server, of the key specific to the secure element on the basis of the join request,
application, by the server, of the first predetermined function to the first datum and to the key obtained by the server, so as to obtain the reference key.

The method according to the first aspect of the invention, can comprise the following optional characteristics, taken singly or in combination whenever technically possible.

The method can also comprise steps for application, by the object, of a second predetermined function to a second datum and to the reference key, so as to generate an integrity code, and transmission to the server of the generated integrity code. In this case, obtaining by the server of the key specific to the secure element comprises the following steps:
for at least one key of a secure candidate element stored by the server:
a) application of the first predetermined function to the first datum transmitted in the join request and to a key of a secure candidate element stored by the server, so as to generate a candidate reference key),
b) application of the second predetermined function to the second datum transmitted in the join request and to the generated candidate reference key), so as to generate a candidate integrity code),
selection of a candidate reference key having served to generate a candidate integrity code equal to the integrity code relative to the join request.

The method can also comprise: application, by the object, of a third predetermined function to a unique identifier of the secure element of the object and to a random datum having a value included in a predetermined finite set, so as to generate a nonce; transmission of the nonce to the server; for at least one unique identifier of a secure candidate element and for at least one candidate value of the predetermined finite set, application of the third predetermined function to the candidate identifier and to the candidate value, so as to generate a candidate nonce; and selection of at least one key of a secure candidate element associated, in a correspondence table, to a candidate identifier having served to generate a candidate nonce equal to the nonce transmitted in the join request, wherein the step a) is conducted only for each key of a selected secure candidate element.

The random datum can be a counter incremented by the object for each new join request.

The third function can comprise a hashing function inputting the identifier of the secure element of the object and the random datum, followed by a truncation.

The nonce can be a datum DevNonce according to the specification LoRaWAN and/or be included in the join request.

Obtaining the key specific to the secure element by the server can comprise the steps of: identification, in a first correspondence table, of an identifier of a secure element associated with the first datum transmitted in the join request, and identification, in a second correspondence table separate to the first correspondence table, of a key associated with the unique identifier of a secure element identified in the first correspondence table.

The join request can be a message according to the specification LoRaWAN.

The first datum can be or depend on at least one of the following data: a unique identifier specific to the object, a unique application identifier specific to an application provider of the object, a nonce.

The reference key can serve to derive session keys for encrypting and authenticating communications between the object and the server or serves to share another key between the object and the server.

According to a second aspect of the invention, a system comprising an object likely to be connected to a network of connected objects, and at least one server, is also proposed wherein the object is configured to:
- apply a first predetermined function to at least one first datum and to a key specific to a secure element of the object, so as to generate the reference key,
- transmit to the server a join request of the object to the network of connected objects, the join request comprising the first datum, the key specific to the secure element however not being transmitted by the object to the server, and wherein the server is configured to:
- obtain the key specific to the secure element on the basis of the join request,
- apply the first predetermined function to the first datum and to the key obtained by the server, so as to obtain the reference key.

DESCRIPTION OF FIGURES

Other characteristics, aims and advantages of the invention will emerge from the following description which is purely illustrative and non-limiting and which must be considered with respect to the appended drawings, in which.

In all figures, similar elements bear identical reference numerals.

DETAILED DESCRIPTION OF THE INVENTION

Figure 1:
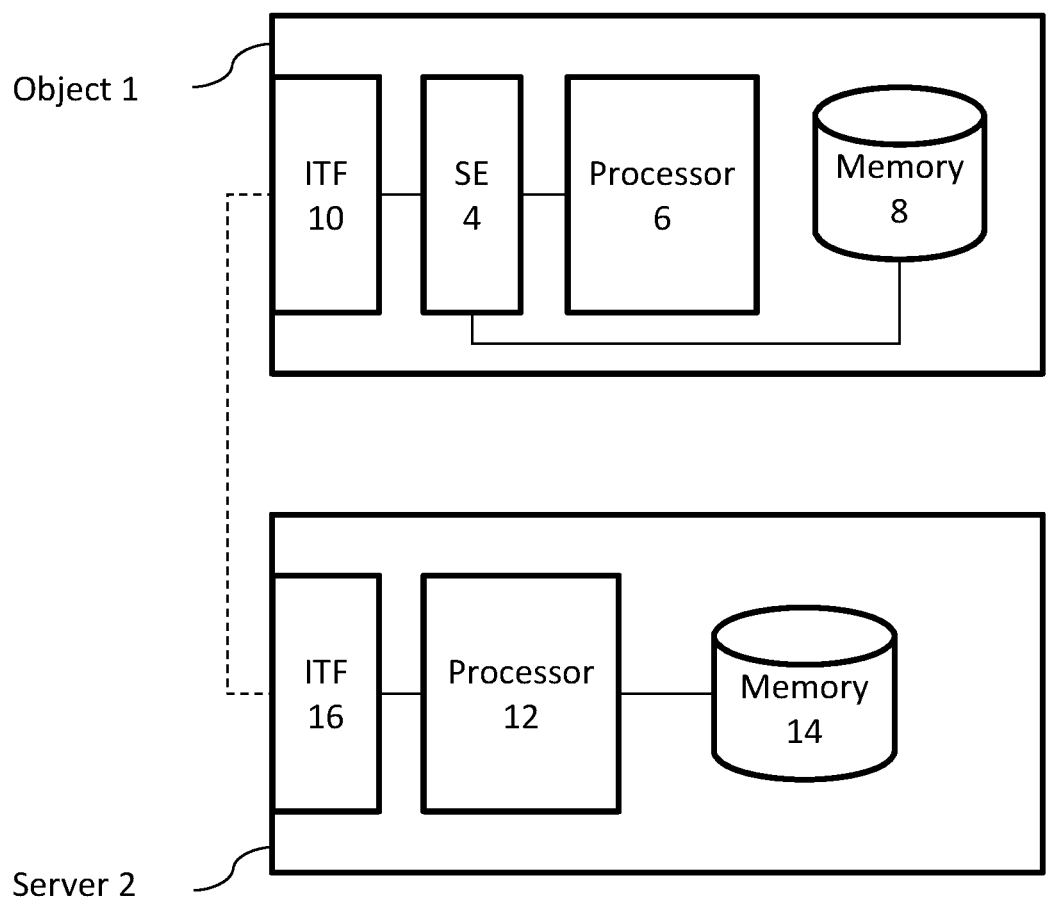
FIG. 1 schematically illustrates a system comprising an object and a server for a network of connected objects, according to an embodiment.

FIG. 1 schematically illustrates an object 1 able to be connected to a network of connected objects via a server 2.

The object 1 comprises a secure element 4, at least one processor 6, at least one memory 8 and a communications interface 10 with the server 2.

The processor 6 is configured to execute computer programs, and in particular a first function f, or even a second function g and a third function h which will be detailed later.

The secure element 4 can be a dedicated physical circuit. This dedicated circuit can be detachable, for example in UICC format. Alternatively, the secure element 4 is virtual, in the sense where it is formed by a specific computer program designed to be executed by the processor 6 of the object 1.

The communications interface 10 is for example of the type wireless radio.

In the following, the example of a communications interface 10 sending or receiving messages complying with the specification LoRaWAN® will be taken, in which case the network of connected objects is a network also according to this specification LoRaWAN.

The secure element 4 stores a key KSE specific to said secure element 4.

The secure element 4 also has a unique identifier IDSE specific to said secure element 4.

Also, the memory 8 of the object 1 comprises at least one non-volatile memory intended to store calculation data persistently (HDD, SSD, Flash, etc.), in particular the following data defined by the specification LoRaWAN version 1:
- DevEUI: a unique identifier specific to the object 1, similar to a serial number.
- AppEUI: a unique application identifier specific to an application provider of the object 1. It classifies different objects such as the object 1 by application.

The server 2 comprises at least one processor 12, at least one memory 14 and a communications interface 16 with at least one object such as the object 1 shown in FIG. 1.

The processor 12 of the server 2 is also configured to execute computer programs, and in particular the first function f, or even the above second function g and the third function h.

The memory 14 of the server 2 comprises at least one non-volatile memory intended to store calculation data persistently (HDD, SSD, Flash, etc.), in particular correspondences tables whereof the contents will be detailed later.

The communications interface 16 is configured to interact with the communications interface 10 of the object 1 and is consequently of the same type.

So that the object 1 and the server 2 can communicate with each other securely, at least one reference key must be shared between the client and the server.

The reference key serves for example to derive session keys for encrypting and authenticating communications between the object 1 and the server 2.

When the network of connected objects is a network complying with LoRaWAN version 1, which is a non-limiting embodiment detailed hereinbelow, this reference key is the application key AppKey, which derives the session keys NwkSKey, AppSKey which encrypt and authenticate communications between the object 1 and the server 2.

Figure 2:
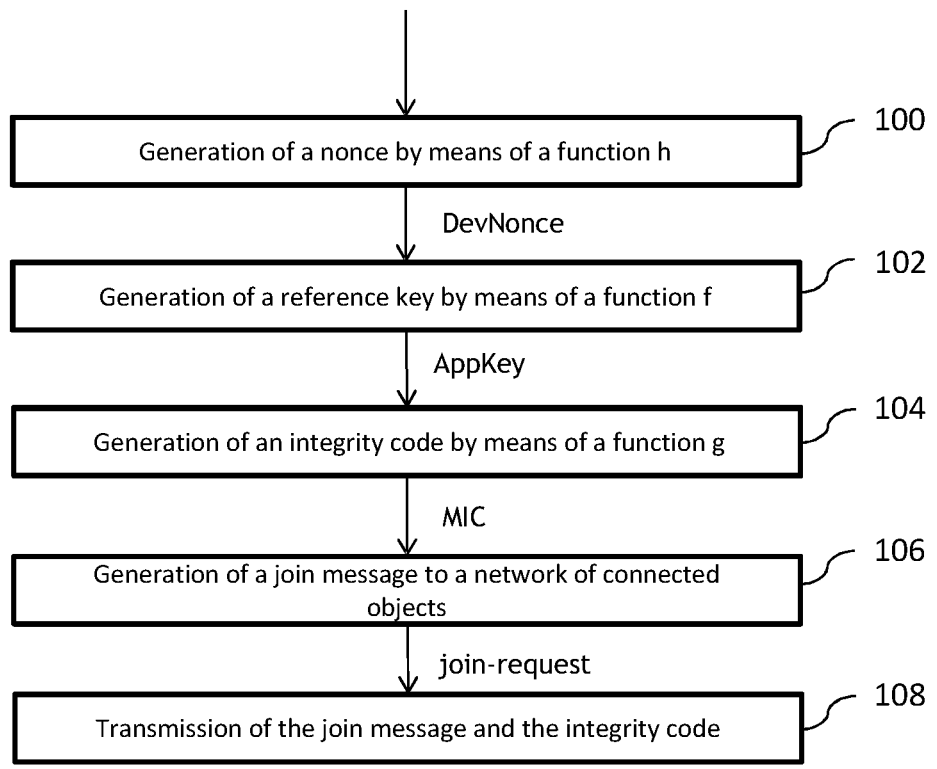
FIGS. 2 and 3 illustrate steps of a method of sharing a key between the object and the server illustrated in FIG. 1, according to an embodiment of the invention.

In reference to FIG. 2, a method of sharing a reference key AppKey between the object 1 and the server 2 according to a first embodiment comprises the following steps.

The processor 6 of the object 1 generates a nonce (step 100). This nonce is intended to be given as a parameter of a join request to a network of connected objects, transmitted by the object 1 to the server 2. The server 2 keeps track of some values of this nonce used by the object 1 historically, and ignores any join request which would reuse one of these values, so as to ensure protection against attacks by replay.

This nonce is the datum DevNonce defined in the specification LoRaWAN. It is coded on two bytes.

Also, the object 1 applies the first function f to at least one first datum and to the key KSE specific to the secure element 4 of the object 1, so as to generate a reference key AppKey (step 102).

This step 102 can be conducted by the processor 6 of the object 1, but is preferably conducted by the secure element 4 so as to prevent the key KSE from being extracted from this secure element 4.

The first datum can be one of the following data defined by the specification LoRaWAN: DevEUI or AppEUI (previously stored in the memory of the object 1) or DevNonce (nonce calculated during the step 100).

During its life cycle, the object 1 can be led to contain different secure elements. For example, when the secure element 4 is in the form of a detachable physical circuit, this circuit can be replaced. The generation 102 of the key AppKey by the connected object 1 can be executed each time a new secure element is included in the connected object 1, that is, each time the key input as the first function changes within the object 1.

In particular, the identifier AppEUI can be led to evolve during the life cycle of the object, for example if the object 1 changes owner and/or associated server.

The processor 6 of the object 1 also generates a join request to a network of connected objects (step 106).

The join request is a "join-request" message according to the specification LoRaWAN. The join-request message conventionally comprises the following data: DevEUI, AppEUI and DevNonce. Consequently, the first datum, having served to calculate the reference key AppKey and being possibly one of the foregoing three data, is included in the join request.

The object 1 also generates an integrity code MIC relative to the join request (step 102). The aim of this integrity code MIC is to authenticate the join request with a recipient, or in other words, to let such a recipient verify if the join request has been sent by an authorized object 1 and if the data contained in the join request are coherent.

The integrity code MIC is generated by application of the second function g to one of the data included in the generated join request and to the reference key AppKey (step 104).

This datum, hereinbelow called second datum, can be in particular the first datum, or else separate to the first datum.

The second function g is for example an encryption function AES.

The join request is transmitted by the communication interface to the server 2 (step 108). The integrity code MIC is also transmitted to the server 2.

In the case of the network LoRaWAN, the join-request message is encapsulated by the processor 6 in a message MAC, as well as the integrity code MIC, before they are sent to the server. The message MAC is typically relayed to the server 2 by an operator (LoRa Network Operator).

Figure 3:
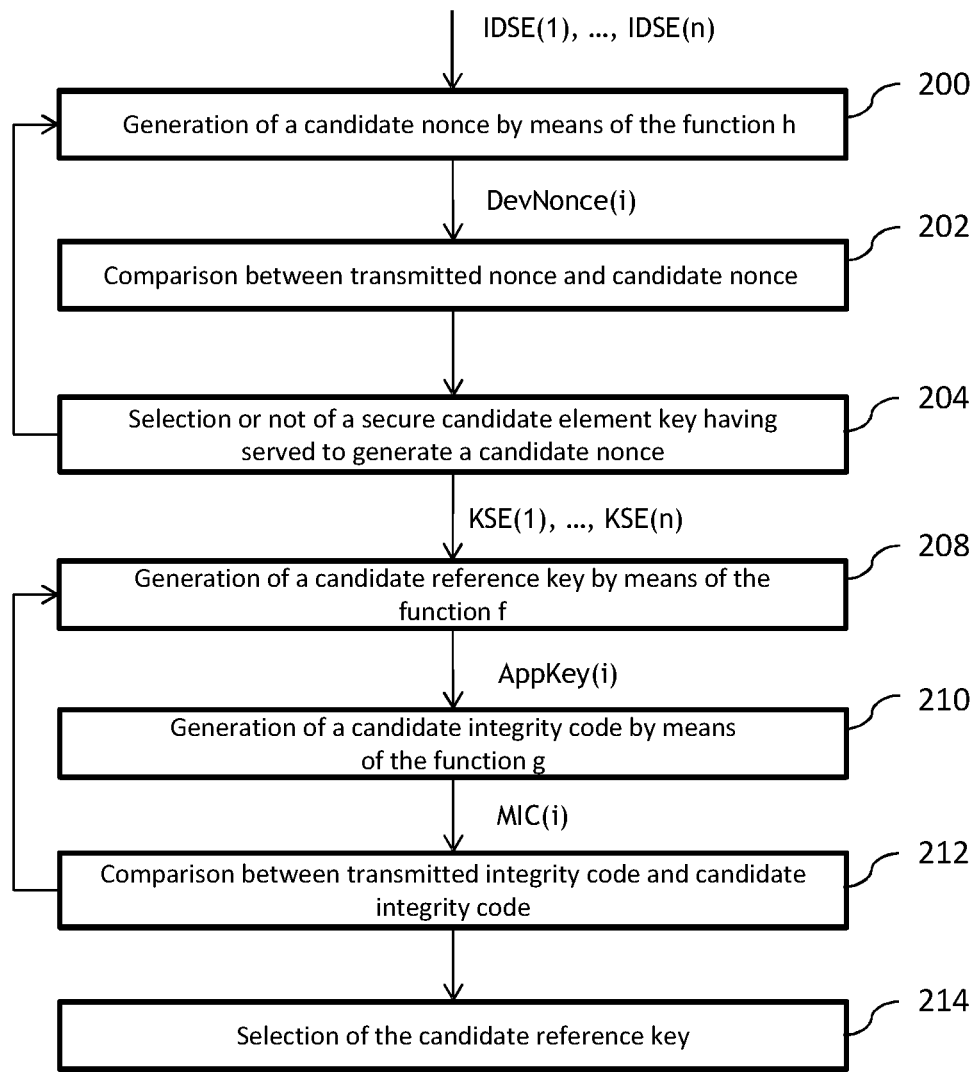

In reference to FIG. 3, the join request is received by the communications interface 16 of the server 2, which sends it to the processor 12 to be processed.

The processor 12 of the server 2 obtains the key KSE specific to the secure element 4, aided by the join request received. However, this obtaining step is executed otherwise than by transmission of the key KSE specific to the secure element 4 by the object 1 to the server. This obtaining step is carried out as follows.

Previously stored in the memory 14 of the server 2 is a plurality of keys of a secure candidate elements KSE(1), . . . , KSE(n). One of them can be equal to the key KSE of the secure element 4 of the object 1.

The processor 12 executes a loop comprising at least one iteration, each iteration using one of the keys of a secure candidate element KSE(1), . . . , KSE(n).

An index iteration i comprises the following steps 208, 210, 212.

The processor 12 applies the first predetermined function f to the first datum (DevEUI, AppEUI or DevNonce) contained in the join request received, and to the key of a secure candidate element KSE(i) stored by the server 2, so as to generate a candidate reference key AppKey(i) (step 208).

Next, the processor 12 applies the second predetermined function g to the second datum (DevEUI, AppEUI, or DevNonce) which has been received by the server in the join request, and to the candidate reference key AppKey(i), so as to generate a candidate integrity code MIC(i) associated with the candidate reference key AppKey(i) (step 210).

The processor 12 then compares the candidate integrity code MIC(i) to the integrity code MIC contained in the join request received by the server 2 (step 212).

If the two codes are not equal, a new iteration is executed for a key of a following secure candidate element KSE(i+1). The steps 208, 210, 212 are then repeated on the basis of the key KSE(i+1).

If the processor 12 performs n iterations and it is noticed that none of the candidate integrity codes MIC(1), . . . , MIC(n) is equal to the integrity code MIC received, then the join request is rejected by the server.

However, if two compared codes MIC(i) and MIC are equal, this means that the join request received by the server 2 is coming from an approved object 1. But this also means that the candidate reference key AppKey(i), having generated the candidate integrity code MIC(i), is equal to the key AppKey held by the object 1, since the object 1 and the server have each used the same second predetermined function g to generate the two compared integrity codes. The processor 12 of the server 2 considers therefore that the key specific to the secure element 4 is the key AppKey(i).

Eventually, the processor 12 selects as key AppKey the candidate reference key having generated a candidate integrity code equal to the integrity code (MIC) relative to the join request (step 214).

As is conventional, the server 2 sends the object 1 a "join-accept" response message indicating to it that the join request has been accepted by the server 2.

The reference key AppKey at this stage becomes a key shared between the object 1 and the server 2.

At a later stage, the reference key AppKey shared can be used conventionally to derive the session keys NwkSKey, AppSKey for encrypting and authenticating communications between the object 1 and the server.

Of course, the maximal number of calculations made by the server 2 to retrieve the reference key AppKey during the preceding method of sharing is proportional to the number n of candidate keys KSE(i) stored by the server 2. Consequently, the following additional steps are advantageously taken during the method, to reduce the number of calculations made in practice by the server 2 to retrieve this reference key AppKey.

Referring back to FIG. 2, during the step 100, the processor 6 of the object 1 or the secure element 4 applies the third predetermined function h to the unique identifier (IDSE) of the secure element 4 of the object 1 and to an random datum having a value included in a predetermined finite set of m values, so as to generate the DevNonce which will then be included in the join request to send to the server.

The third function is for example the following:

$$DevNonce=trunc(hash(IDSE,counter))$$

when
  counter is the random datum,
  hash designates a hashing function,
  trunc is a truncation which retains only 2 bytes of the
    result of the hashing function.

Referring back to FIG. 3, a correspondence table between unique identifiers of secure elements IDSE(1), . . . , IDSE(n) and the keys of secure elements KSE(1), . . . , KSE(n) discussed previously has been previously stored in the memory 14 of the server 2. In other words, for any i going from 1 to n, the unique identifier IDSE(i) and the key KSE(i) relate to the same secure element, and therefore match in the correspondence table stored in the memory 14 of the server 2.

Of course, one of the candidate identifiers IDSE(1), . . . , IDSE(n) can be equal to the unique identifier IDSE stored by the secure element 4 of the object 1.

It is also assumed that the server knows the finite set to which the random datum belongs.

The processor 12 of the server 2 conducts the following steps for at least one unique identifier of a secure candidate element IDSE(i) of index i and for at least one candidate value of the predetermined finite set of index j.

The processor applies the third predetermined function h to the candidate identifier IDSE(i) and to the candidate value of index j, so as to generate a candidate nonce, by convention called DevNonce(i,j) (step 200).

The processor compares the DevNonce received in the join request to each candidate nonce generated (202).

If a generated candidate nonce DevNonce(i,j) is equal to the DevNonce, the processor 12 selects the key of a secure element KSE(i) associated in the correspondence table with the unique identifier of a secure candidate element IDSE(i) having served to generate the candidate nonce DevNonce(i, j) (step 204).

If a generated candidate nonce DevNonce(i,j) is different to the DevNonce, during the step 204 the processor 12 does not select the key of a secure element KSE(i) associated in the correspondence table with the unique identifier of a secure candidate element IDSE(i) having served to generate the candidate nonce DevNonce(i,j).

The processor repeats for example the steps 200, 202, 204 for any i going from 1 to n, and for any element of the finite set (of cardinal m).

It should be noted that the number of keys of secure candidate elements IDSE(i) selected by the server can be equal to 1, but can also be greater than 1. In fact, the truncation trunc of the third function h may generate collisions, that is, produce DevNonces(i,j) of same value from input data of the third function, however different.

The steps 208, 210 and 212 are then conducted only for each key of a secure candidate element selected during the step 204.

The previous calculation 200 of the candidate nonces performs pre-filtering of keys of secure candidate elements KSE(i) stored in the memory 14 of the server 2, the number of which can be huge. Certainly, the additional steps 200, 202, 204 of this pre-filtering cause an extra calculation load; yet this extra load, relatively small, is greatly compensated by the fact that the number of iterations calling for the first function (in the step 208) and to the second function (in the step 210) is largely reduced. The overall calculation load consumed by the server to obtain the key KSE of the secure element 4 is therefore eventually largely reduced by way of steps 208, 210, 212.

This savings in calculation load is particularly advantageous when calculations are entrusted to a hardware security module (HSM) having minimal material resources only.

Also, this savings in calculation load is obtained without there having been a need to modify the format of the join-request. In fact, the nonce DevNonce, already imposed by the specification LoRaWAN to prevent attacks by replay, is astutely calculated from a datum characteristic of the secure element 4 (the unique identifier IDSE of this secure element), then leveraged by the server to perform pertinent pre-filtering of keys KSE(i) server side 2.

The random datum used to calculate the DevNonce object side 1 is for example the current value of a counter, and the finite set is constituted by whole numbers going from 0 to m−1. The counter therefore has m−1 as maximal value. The counter is incremented by the object 1 each time this object must send a new join request (regardless of whether this request is accepted or not by the server). The counter is reset to zero once it reaches its maximal value m.

The server 2 also uses the value of a second counter CO as input datum of the third function h to generate a candidate nonce during the step 200. This counter is incremented by the server for each time the step 200 is conducted. CO(i) is noted as the value of the second counter at the start of the method.

The first counter is incremented for each new join request to be sent. But the server 2 is not necessarily aware of such an emission, and therefore there can be desynchronization between the first counter and the second counter. A predetermined spread Δ is therefore advantageously used. For any i going from 1 to n, the server calculates Devnonce for all the counter values going from CO(i) to CO(i)+Δ. It stops as soon as it finds a correct value.

It should be noted that the steps 200 to 214 can be conducted by one and the same server 2, or else can be conducted by an array of servers, each server conducting just some of the steps. For example, a first server can take on executing the pre-filtering of keys (steps 200, 202, 204), and a second server conducts the steps 208 to 214.

Other ways to obtain the key KSE server side can be carried out.

In a second embodiment, the server—or an array of servers—conducts the following steps.

Previously stored in the memory 14 of the server 2 are two correspondence tables:
- a first correspondence table between possible values for the first datum (which, on recall, can be DevEUI, AppEUI, or DevNonce) and identifiers of keys of secure elements IDSE(1), . . . , IDSE(n), and
- a second table similar to that used in the first embodiment described with respect to FIGS. 2 and 3, that is, a correspondence table between unique identifiers of secure elements IDSE(1), . . . , IDSE(n) and keys of secure elements KSE(1), . . . , KSE(n).

In the first correspondence table, the server identifies an identifier of a secure element associated with the first datum (DevEUI, AppEUI or DevNonce) transmitted in the join request.

In the second correspondence table, the server then identifies a key associated with the unique identifier of a secure element identified in the first correspondence table. This key is the key KSE.

Using two correspondence tables brings some flexibility of execution. One of the two tables can be stored and browsed by a first server, and the other table be stored and browsed by a second server different to the first server; as a variant, the two tables can be stored and browsed by one and the same server.

A method of sharing of a reference key serving to derive session keys for encrypting and authenticating communications between the object 1 and the server 2 has been described previously. But the reference key can serve a different purpose. The sharing key is for example a key serving to share another key between the object 1 and the server 2, this other key having a predetermined destination. The sharing of the other key can comprise calculation of the same value of key object side 1 and server side 2. As a variant, at least one of the object 1 and of the server 2 can know in advance the value of the other key, but not know in advance that this value has this predetermined destination. The sharing of this key brings confirmation to the entity knowing in advance this value must be used for this predetermined destination.

Also, the invention is likewise applicable to protocols other than that defined in the specification LoRaWAN version 1. In particular, the reference key can be the key called NwkKey in the specification LoRaWAN version 1.1.

The invention claimed is:

1. A method comprising:

generating a reference key by an object able to connect to a network of connected objects, wherein generating the reference key comprises applying, by the object, a first predetermined function to at least one first datum and to a key specific to a secure element of the object, transmitting to a server a join request of the object to the network of connected objects, the join request comprising the first datum, wherein the key specific to the secure element is not transmitted by the object to the server, obtaining, by the server, the key specific to the secure element on the basis of the join request, generating the reference key by the server such that the reference key is shared between the object and the server, wherein obtaining the reference key comprises applying, by the server, the first predetermined function to the first datum and to the key specific to the secure element obtained by the server.

2. The method according to claim 1, further comprising:

applying, by the object, a second predetermined function to a second datum and to the reference key, so as to generate an integrity code, transmitting to the server the generated integrity code, and wherein obtaining the key specific to the secure element comprises:

for at least one key of a secure candidate element stored by the server:

applying the first predetermined function to the first datum transmitted in the join request and to a key of a secure candidate element stored by the server, so as to generate a candidate reference key), applying the second predetermined function to the second datum transmitted in the join request and to the generated candidate reference key), so as to generate a candidate integrity code), selecting a candidate reference key having served to generate a candidate integrity code equal to the integrity code relative to the join request.

3. The method according to claim 2, further comprising:

applying, by the object, a third predetermined function to a unique identifier of the secure element of the object and to a random datum having a value included in a predetermined finite set, so as to generate a nonce, transmitting the nonce to the server, for at least one unique identifier of a secure candidate element and for at least one candidate value of the predetermined finite set, applying the third predetermined function to the candidate identifier and to the candidate value, so as to generate a candidate nonce, selecting at least one key of a secure candidate element associated, in a correspondence table, to a candidate identifier having served to generate a candidate nonce equal to the nonce transmitted in the join request, wherein step a) is conducted only for each selected key of a secure candidate element.

4. The method according to claim 3, wherein the random datum is a counter incremented by the object for each new join request.

5. The method according to claim 3, wherein the third function comprises a hash function applied to the identifier of the secure element of the object and to the random datum, followed by a truncation.

6. The method according to claim 3, wherein the nonce is a datum DevNonce according to the specification LoRaWAN.

7. The method according to claim 3, wherein the nonce is included in the join request.

8. The method according to claim 1, wherein obtaining the key specific to the secure element comprises:

finding, in a first correspondence table, an unique identifier of a secure element associated with the first datum transmitted in the join request, finding, in a second correspondence table separate to the first correspondence table, of a key associated with the unique identifier of a secure element found in the first correspondence table.

9. The method according to claim 1, wherein the join request is a message according to the specification LoRaWAN.

10. The method according to claim 1, wherein the first datum is or depends on at least one of the following data:

a unique identifier specific to the object, a unique application identifier specific to an application provider of the object, a nonce.

11. The method according to claim 1, wherein the reference key serves to derive session keys for encrypting and authenticating communications between the object and the server or serves to share another key between the object and the server.

12. A system comprising an object which can connect to a network of connected objects, and at least one server, wherein the object comprises:

at least one processor configured to generate a reference key, wherein generating the reference key comprises applying a first predetermined function to at least one first datum and to a key specific to a secure element of the object, a communications interface configured to transmit to the server a join request of the object to the network of connected objects, the join request comprising the first datum, the key specific to the secure element however not being transmitted by the object to the server, and wherein the server is configured to:

obtain the key specific to the secure element on the basis of the join request, obtain the reference key, wherein obtaining the reference key comprises applying the first predetermined function to the first datum and to the key obtained by the server.

* * * * *